US007093351B2

(12) United States Patent
Kelley et al.

(10) Patent No.: US 7,093,351 B2
(45) Date of Patent: Aug. 22, 2006

(54) SYSTEM, FOR MATCHING HARNESSES OF CONDUCTORS WITH APERTURES IN CONNECTORS

(75) Inventors: James A. Kelley, Fort Worth, TX (US); Richard A. Malleck, Fort Worth, TX (US); Richard G. Lyons, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 219 days.

(21) Appl. No.: 10/749,056

(22) Filed: Dec. 30, 2003

(65) Prior Publication Data

US 2005/0147819 A1 Jul. 7, 2005

(51) Int. Cl.
*B23P 19/00* (2006.01)
*G06F 7/00* (2006.01)

(52) U.S. Cl. ........................... 29/749; 29/745; 29/748; 29/33 F; 29/825; 700/213; 700/116; 700/95

(58) Field of Classification Search .......... 29/745–749, 29/755, 33 F, 564.1, 857–868, 564.6, 721, 29/705–709; 700/115–116, 95, 213
See application file for complete search history.

(56) References Cited

U.S. PATENT DOCUMENTS

| | | | | |
|---|---|---|---|---|
| 4,462,155 A | | 7/1984 | Brunelle et al. | |
| 4,631,823 A | | 12/1986 | Collier et al. | |
| 4,727,637 A | | 3/1988 | Buckwitz et al. | 29/407 |
| 4,890,382 A | | 1/1990 | Anderson et al. | |
| 5,179,775 A | * | 1/1993 | Bogotzek et al. | 29/564.4 |
| 5,198,983 A | | 3/1993 | Blake et al. | 364/468 |
| 5,477,606 A | | 12/1995 | Igura | 29/721 |
| 5,590,457 A | | 1/1997 | Ninchi | 29/721 |
| 5,610,454 A | * | 3/1997 | Nishikawa et al. | 307/147 |
| 5,682,672 A | | 11/1997 | Taniguchi | 29/748 |
| 5,970,609 A | * | 10/1999 | Shioda | 29/861 |
| 5,987,743 A | | 11/1999 | Yui | 29/850 |
| 6,169,934 B1 | | 1/2001 | Nakayama et al. | 700/213 |
| 6,272,387 B1 | | 8/2001 | Yoon | 700/83 |
| 6,477,437 B1 | | 11/2002 | Hirota | 700/95 |
| 6,687,639 B1 | * | 2/2004 | Taniguchi et al. | 702/117 |
| 2003/0163917 A1 | | 9/2003 | Davidshofer et al. | 29/854 |

* cited by examiner

*Primary Examiner*—Minh Trinh
(74) *Attorney, Agent, or Firm*—Bracewell & Giuliani LLP

(57) ABSTRACT

A system for assembling wire harnesses with their connectors utilizes a compact computer-based system that is linked to an engineering data base. The data base contains component information, such as harness number, associated wires, and pin location to connector. An integrated tool contains a light panel that is linked to a dummy connector. The dummy connector has a mating end for the connector being pinned. The connector is mated to the dummy connector such that pin holes in the connector align with the light rods in the dummy connector. The wires are identified by voice recognition, bar code, and/or optical character recognition. Once a wire has been identified, the system illuminates the appropriate pin location on the selected connector, thereby providing a visible point of light in which the selected wire is to be terminated.

16 Claims, 8 Drawing Sheets

SYSTEM, FOR MATCHING HARNESSES OF CONDUCTORS WITH APERTURES IN CONNECTORS

BACKGROUND OF THE INVENTION

1. Technical Field

The present invention relates in general to assembling complex wire harnesses and, in particular, to an improved system, method, and apparatus for assembling wire harnesses with a connector light array designator.

2. Description of the Related Art

Many different industrial applications require the termination of large bundles or harnesses of wires into various types of connectors. In some applications, such as aircraft or automotive systems, each harness may contain more than 100 wires that must be routed and terminated in dozens of connectors throughout the assembly.

In the prior art, current wire/connector matching and termination methods begin by printing engineering data that displays the wire numbers and their related pin locations in the connector. A technician moves to the pre-selected wire harness, which may be remote or difficult to access, where he or she will perform the wire pinning operation. Such pinning operations typically comprise random selection of a wire from a harness of bundled wires. As shown in FIGS. 1 and 2, once the wire 21 has been identified by its label 23, the technician reads the engineering data 25 on the wire 21 to determine a pin location 27 on the connector 29 in which the wire 21 will be inserted. Once the pin location 27 on the connector 29 has been cross-referenced on engineering data 25, the task of locating the pin location 27 within the connector 29 must be done in order to insert the wire 21.

As illustrated in FIG. 3, this operation has a number of potentially high risk sources of error, including extremely small wire diameter, a large number of wires 21 per connector, close proximity of the wires in numerous harnesses 31, and limited work space 33, which creates awkward work positions. Thus, an improved system, method, and apparatus for matching harnesses of conductors with associated ones of apertures in connectors is needed.

SUMMARY OF THE INVENTION

One embodiment of a system, method, and apparatus for assembling wire harnesses with their connectors utilizes a compact computer-based system that is linked to an engineering database. The database contains component information, such as harness number, associated wires, and pin location to connector. FIG. 4. Connected to the computer system is a tool that contains an LED light panel that, in turn, is linked to a dummy connector via light rods. FIG. 5. The dummy connector has a mating end for the connector being pinned, which can be male or female.

The connector to be pinned is mated to the dummy connector (e.g., via threads) and automatically clocks to a correct position that allows the pinholes in the connector to align with the light rods in the dummy connector. Once in place, the technician begins the task of selecting and placing the wires into their correct location.

Identifying each of the wires may be accomplished by one or more of a number of different methods. In one method, a voice recognition software allows an operator to orally identify the wires to the computer. The technician simply reads aloud the identifying string of characters that appear on the exterior of the wire so that the computer can identify the wire. The voice recognition software is enhanced to disregard background noise and non-alphanumeric words that are spoken or otherwise detected by the system. Other methods utilize bar code readers or optical character recognition readers (e.g., vision systems) to read the identifying information on the selected wire and thereby identify the selected wire by translating the information into a format that can be cross-checked against the engineering data.

Once the wire has been identified, the system then signals the appropriate light to be switched on within the LED panel in the dummy connector. The light emitted by the LED is transferred via a light rod to the appropriate pin location on the selected connector, thereby providing a visible point of light in which the selected wire is to be terminated. FIG. 7. This process is repeated until all of the wires are pinned. These methods can be used interchangeably at any time, which gives the technician the ability to selectively toggle between methods with a push of button, depending on his or her preference.

The system can operate in very confined areas, is portable in nature, and is easily maintained. In addition, the system is easy to learn, easy to use, and virtually error free. In contrast, prior art systems are not so flexible, as they require much larger open areas (such as bench tops), and/or the attachment of a low voltage power source at the opposite end of the harness being pinned. The design of the present invention allows for it to be used by manufacturers or harness assemblers requiring much more remote and limited access, such as in the assembly of automobiles or aircraft.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
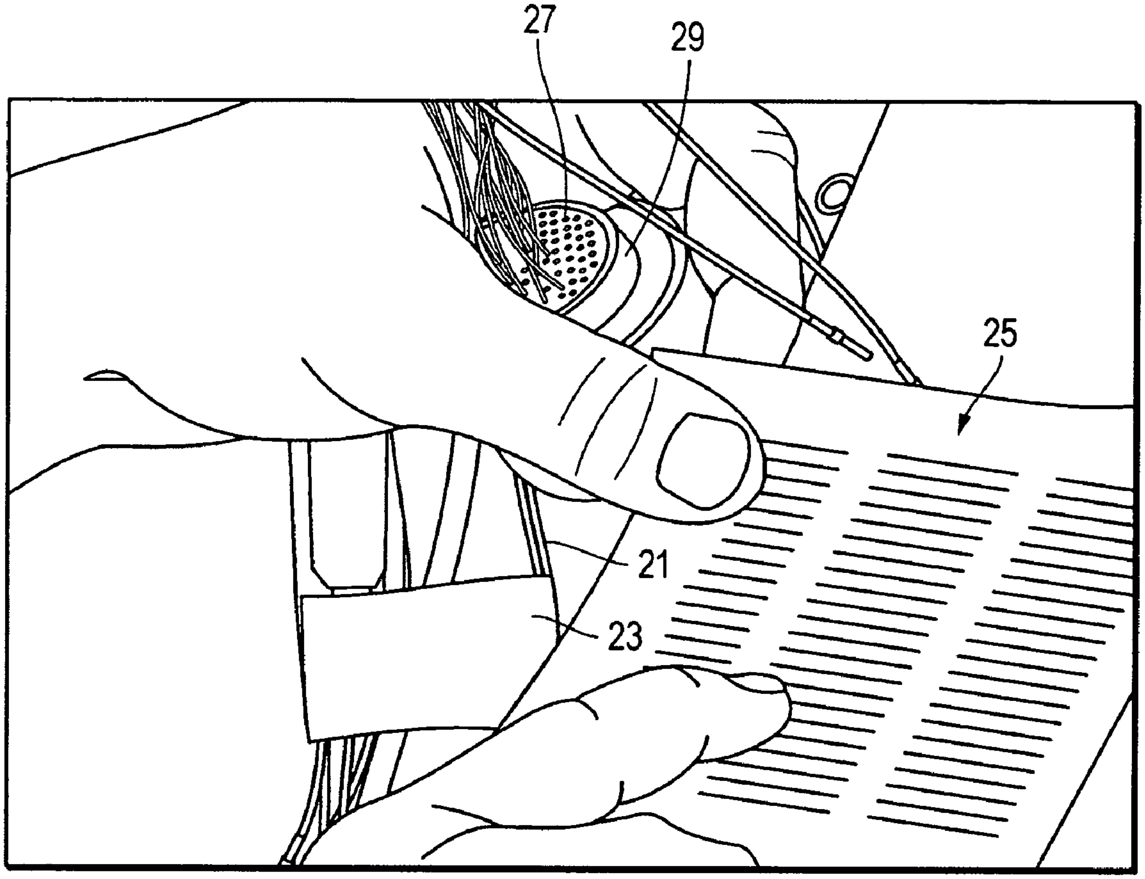
FIG. 1 (Prior Art)
FIG. 1 is an isometric view of one step in a conventional wire harness assembly method.
Figure 2:
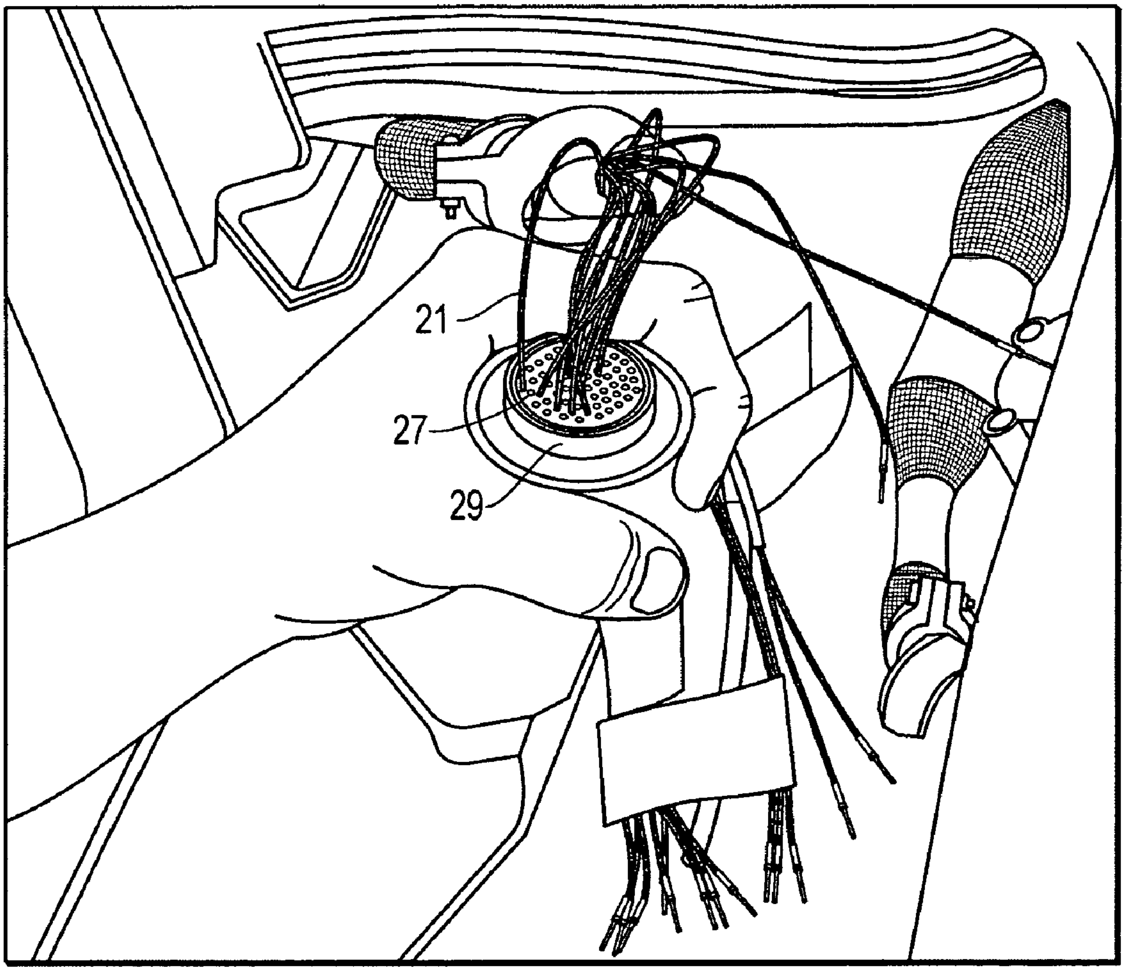
FIG. 2 (Prior Art)
FIG. 2 is an isometric view of another step in a conventional wire harness assembly method.
Figure 3:
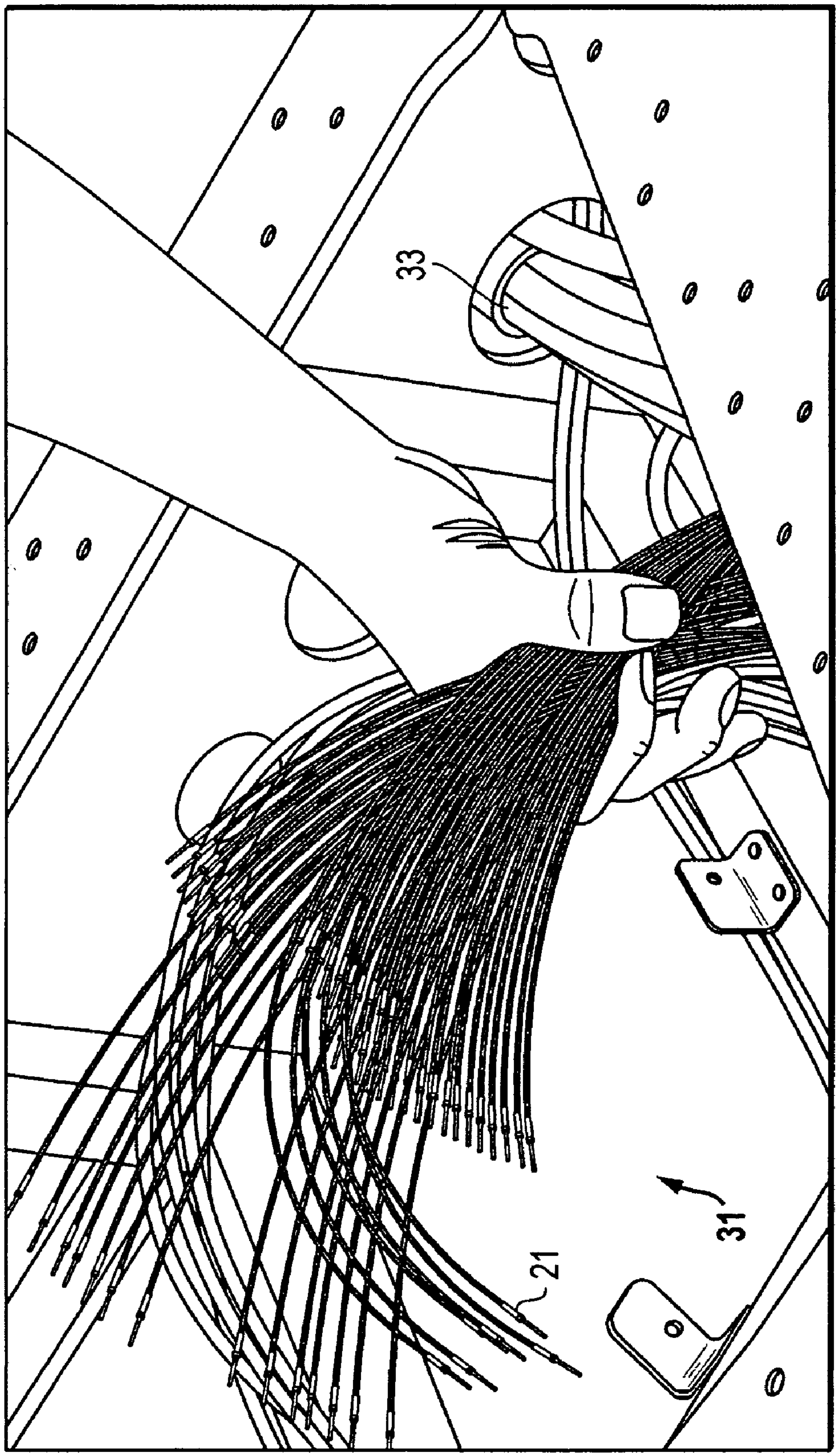
FIG. 3 (Prior Art)
FIG. 3 is an isometric view of a plurality of conventional wire harnesses in an assembly operation.
Figure 4:
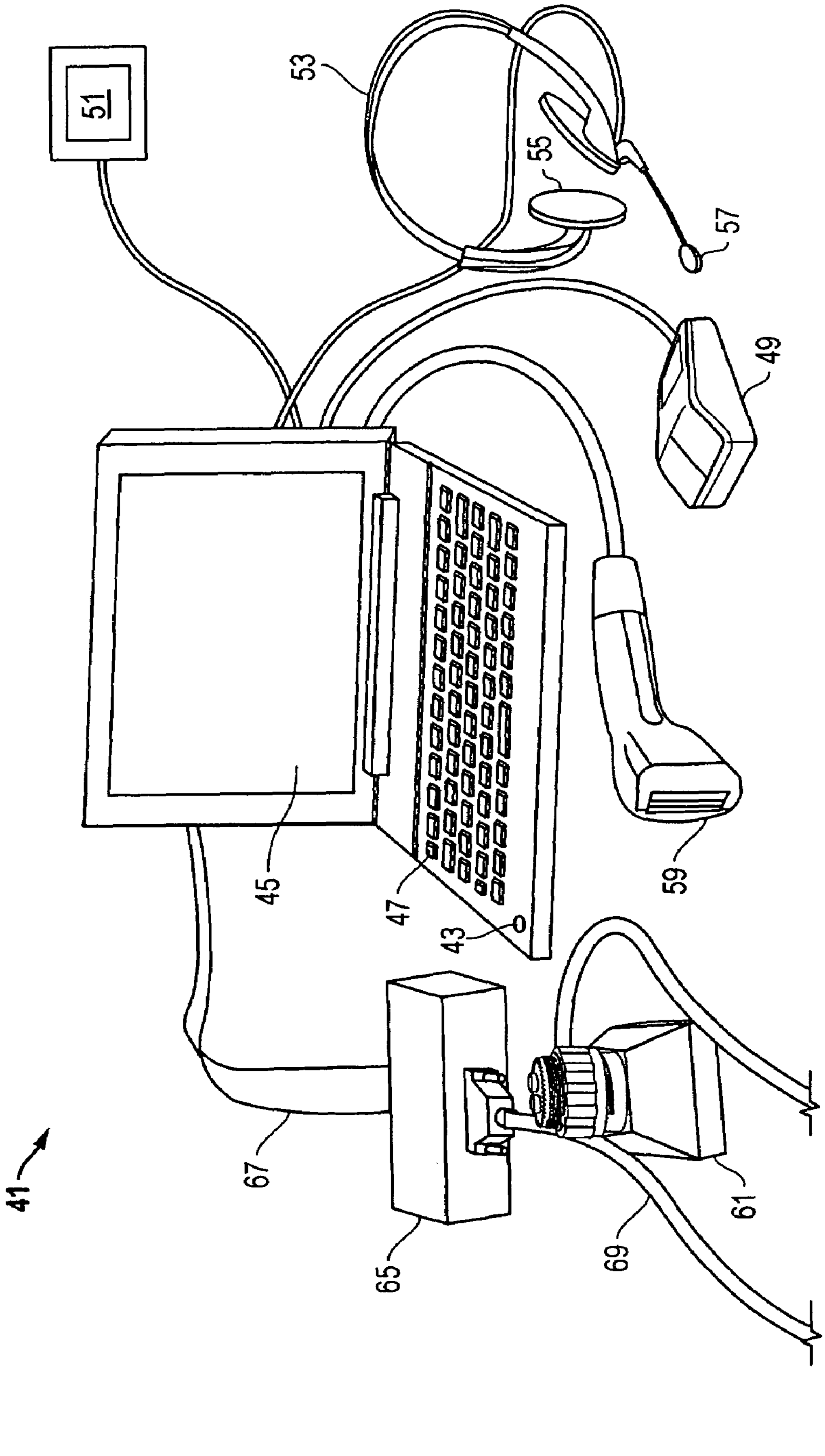
FIG. 4 is an isometric view of one embodiment of a system for wire harness assembly constructed in accordance with the present invention.
Figure 5A:
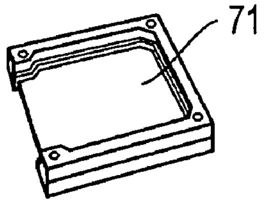
FIGS. 5(*a*)–5(*h*) are isometric views of one embodiment of a light array designator for the system of FIG. 4 shown at various stages of assembly.
Figure 5B:
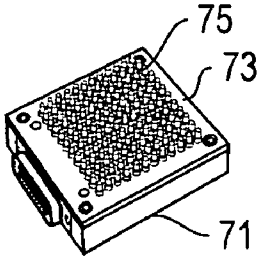
Figure 5C:
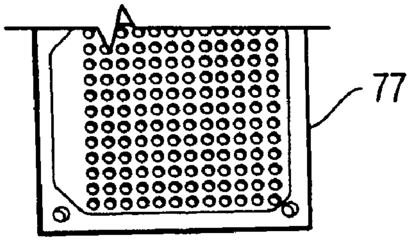
Figure 5D:
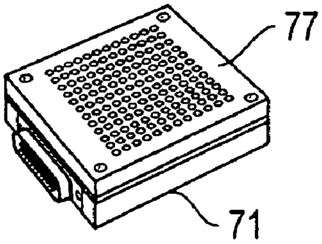
Figure 5E:
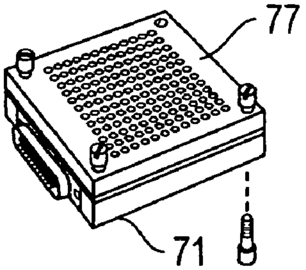
Figure 5F:
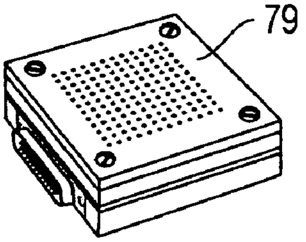
Figure 5G:
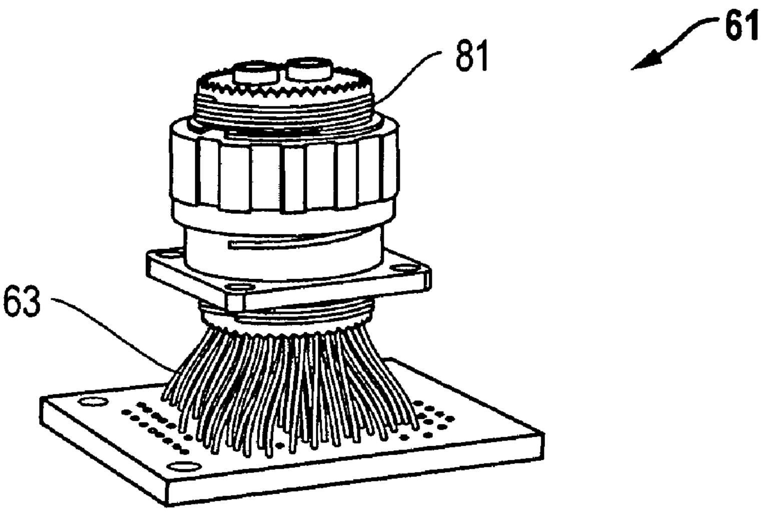
Figure 5H:
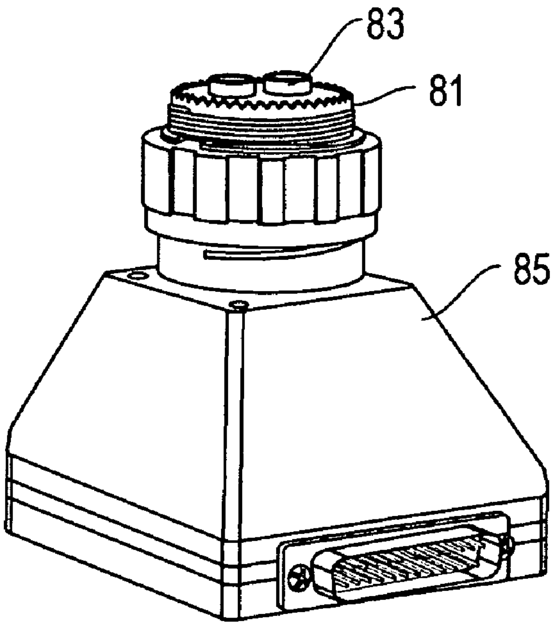

Referring to FIG. 4, one embodiment of a system 41, method, and apparatus for matching conductors with apertures in a connector is disclosed. The term "conductors" is used generically herein to refer to all types of conductors including but not limited to electrical and optical conductors, a single strand of wire, wires, and/or a cable of wires, etc. As described above and shown in the preceding FIGS. 1–3, the conductors 21 are usually bundled in groups or harnesses 31. A typical harness 31 may comprise only a few conductors 21 or more than 100 conductors 21. A typical connector 29 has many apertures 27 for receiving the terminal ends of the conductors 21.

The system 41 includes many different components, some of which are optional, as will be described below. Although many of these components are illustrated as being "hard-wired" to each other, they may utilize wireless technology as well. A main component of system 41 is a computer 43, such as the laptop computer shown. Computer 43 has a visual display 45 for displaying information to a user, and a keyboard 47 and a mouse 49 for manual entry of information by the user. A data base 51 is coupled to the computer 43 and has information regarding the harnesses 31, the conductors 21, and the connectors 29.

The system 41 has several alternative "reading means" that are coupled to the computer. The reading means are provided for inputting or reading information associated with individual ones of the conductors 21 and the various connectors 29. For example, keyboard 47 and mouse 49 may be used to manually enter the information and thereby to identify the conductors 21 and the connectors 29.

Alternatively, the reading means may comprise a head set 53 having speakers 55 and a microphone 57. When used with software and coupled to the computer 43, the head set 53 receives voice information from the user regarding the conductors 21 and the connectors 29 when read aloud by the user to identify them. Another alternative means for inputting information is a bar code reader 59 and software coupled to the computer for scanning information from the conductors 21 and the connectors 29 to identify them. The user also has the opportunity to select the input method for reading information from a list of options on the visual display 45 of the computer 43.

Figure 6:
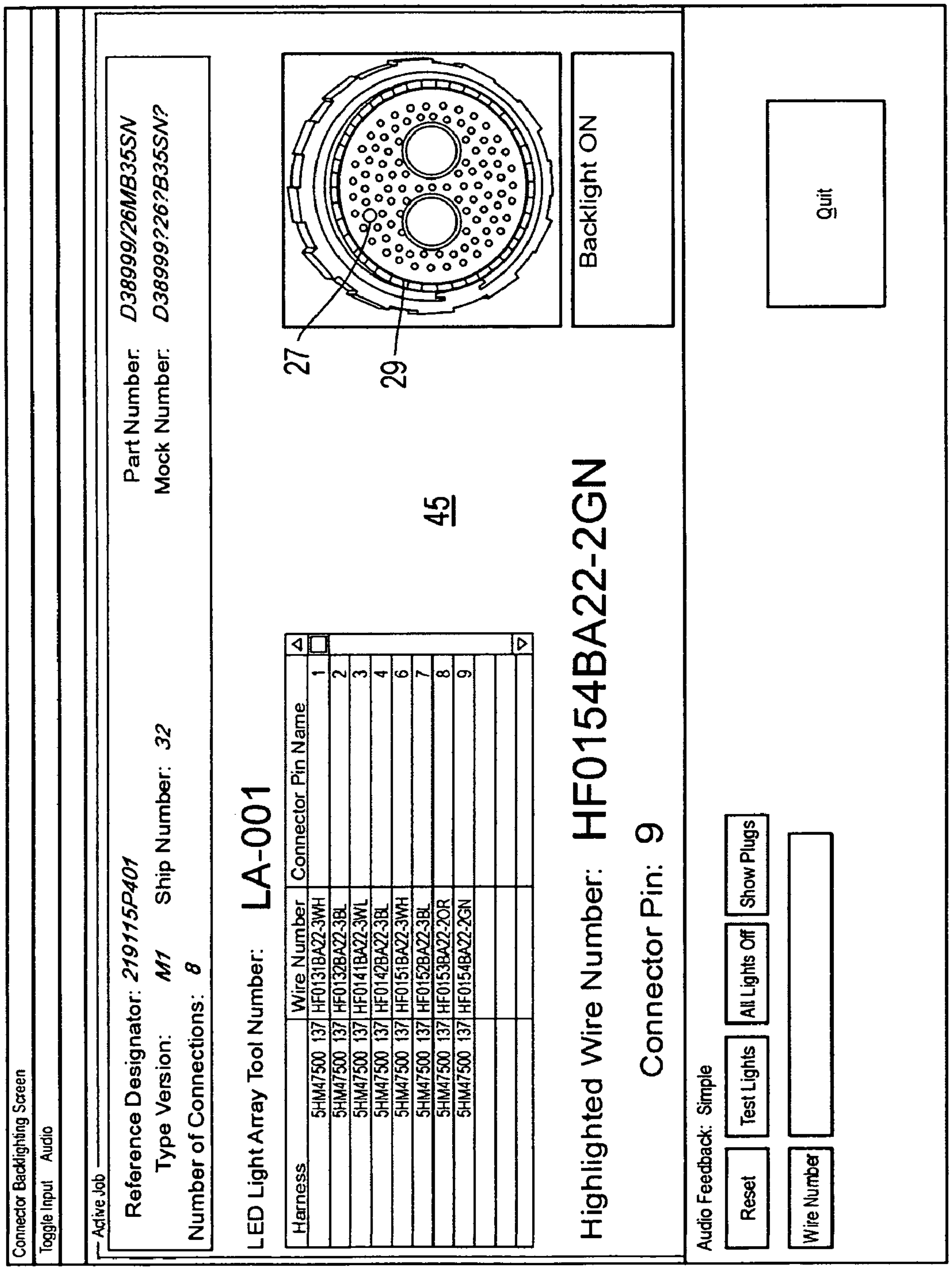
FIG. 6 is a schematic diagram of a diagnostic screen viewed by a technician while utilizing the system of FIG. 4.

The system 41 also comprises a designator or light array 61 that is coupled to the computer 43 and connectable to the selected connector 29. As shown in FIG. 5(*g*), the light array 61 has a plurality of light conductors 63 for illuminating individual ones of the apertures 27 in the connector 29 in response to commands from the computer 43 in order to designate to the user the aperture 27 in which each conductor 29 should be located. For example, as shown in FIG. 6, the visual display 45 of the computer 43 graphically illustrates a selected one of the apertures 27 in the connector 29 to indicate the aperture 27 in which a selected one of the conductors 21 should be inserted. In the embodiment shown, the light array 61 back-lights a selected one of the apertures 27 in the connector 29 in the same manner for the user to clearly define the aperture 27.

Light array 61 also utilizes an input/output expander circuit 65 that is coupled between the computer 43 and the light array 61. The input/output expander circuit 65 has a communication cable 67 extending to the computer 43, and a light cable 69 extending to the light array 61.

As shown in FIGS. 5(*a*) through 5(*h*), the light array 61 comprises a cover plate 71, an array of LEDs 75 mounted to a circuit board 73 on the cover plate 71, a separation plate 77 mounted to the cover plate 71 over the array of LEDs 75, a light rod guide plate 79 mounted to the separation plate 77, a mating connector 81 for coupling with the connector 29 and having a plurality of apertures 83, a light rod 63 extending between each of the apertures 83 in the mating connector 81 and each of the LEDs 75, and a covering 85 for integrating the components of the light array 61. The light rod guide plate 79 accommodates various diameters of light rods 63 so that many different types of connectors 29 can used with system 41.

Figure 7:
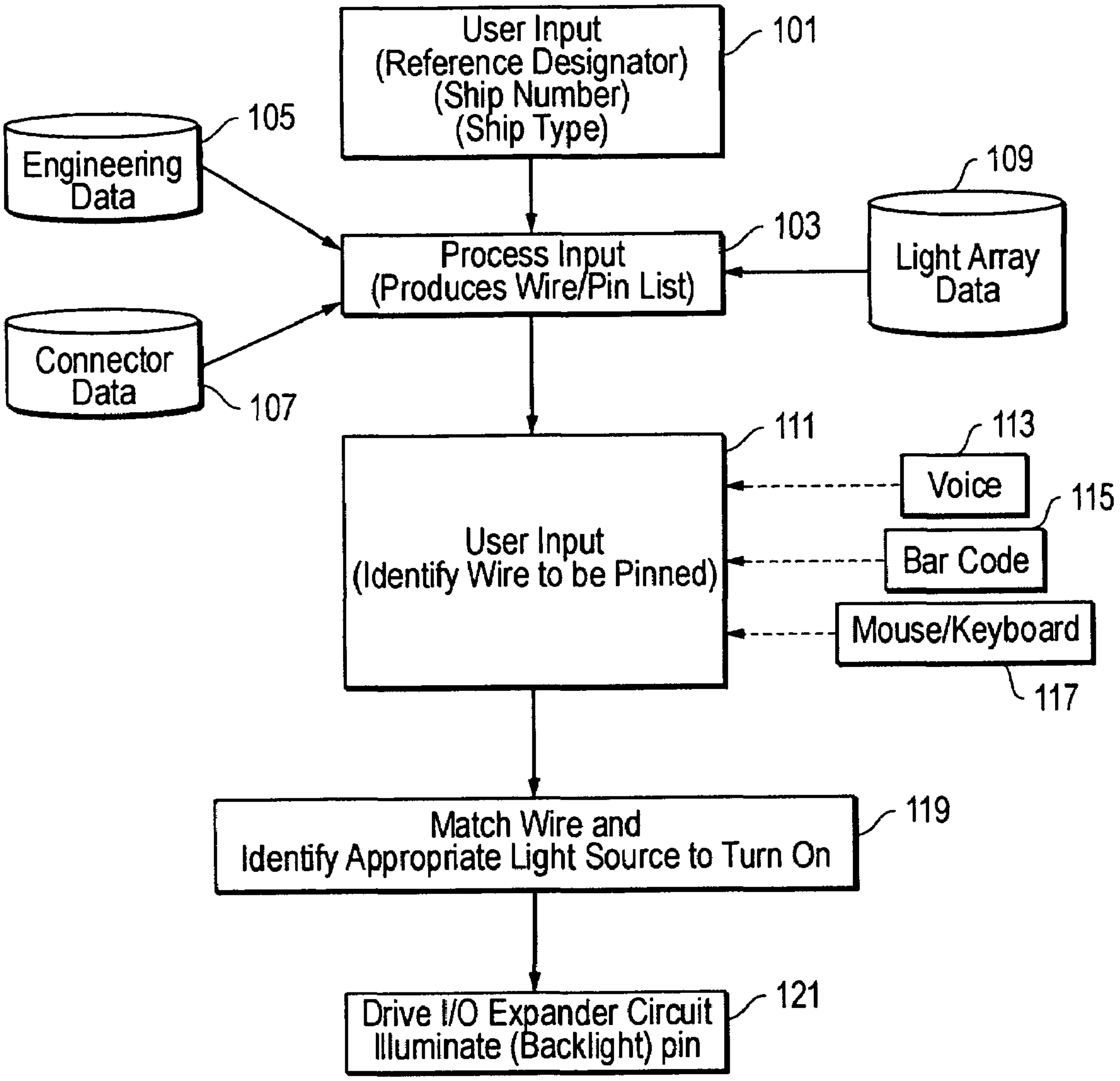
FIG. 7 is one embodiment of a data flow diagram for the system of FIG. 4.

Referring now to FIG. 7, one embodiment of a data flow diagram is shown which illustrates one embodiment of the above-described process. As depicted at block 101, the process is initiated with user input including a reference designator, ship number, and ship type. As illustrated at block 102, a wire/pin list is produced with process input, including user input 101, engineering data 105, connector data 107, and light array data 109. The user selects a wire to be pinned, as depicted at block 111, and enters information associated with the wire. The information may be input, for example, via voice (block 113), bar code (block 115), or manually by mouse or keyboard (block 117). As depicted at block 119, the computer then matches the wire with the appropriate aperture in the connector and identifies the aperture by turning on the appropriate light source (e.g., one of the LEDs). The drive input/output expander circuit then illuminates (backlights) the pin aperture, as illustrated at block 121.

The present invention also includes a method of matching a harness of conductors with apertures in a connector. In one embodiment, the method comprises providing a harness 31 having a plurality of conductors 21, and a connector 29 having a plurality of apertures 27 for receiving the conductors 21. The method further comprises selecting one of the conductors 21 and inputting information related to said one of the conductors 21 into a computer 43. The inputting step may comprise receiving voice information from a user regarding the conductors 21 when read aloud by the user to identify the conductors 21, scanning information (e.g., bar codes) from the conductors 21 to identify the conductors 21, and/or manual entry of information from the conductors 21 to identify the conductors 21. The method may further comprise allowing the user to select an input method for inputting information from the conductors 21.

The computer 43 displays the information and illuminates a corresponding one of the apertures 27 in the connector 29 via a command from the computer 43. In the embodiment, shown and described the illumination takes place by back-lighting the apertures 27 in the connector 29. The user inserts said one of the conductors 21 into said corresponding one of the apertures 27, and then repeats these steps for another one of the conductors 21 until all of the conductors 21 in the harness 31 are terminated in their proper apertures 27 in the connector 29.

The present invention has several advantages, including the ability to quickly and accurately assemble bundles of wires and connectors. The wires may be identified and pinned in a number or ways, including by voice recognition, bar code, or optical character recognition. The identifying information on the selected wire is read and thereby identify the selected wire by translating the information into a format that can be cross-checked against the engineering data.

The illuminated pin hole in the connector provides for very fast and accurate placement of the wires. The system can operate in confined areas, is portable in nature, and is easily maintained. In addition, the system is easy to learn, easy to use, and virtually error free. In contrast, prior art systems are so flexible, as they require larger open areas, or the attachment of a low voltage power source at the opposite end of the harness being pinned. The design of the present invention allows for it to be used by manufacturers or harness assemblers requiring much more remote and limited access, such as in the assembly of automobiles or aircraft.

While the invention has been shown or described in only some of its forms, it should be apparent to those skilled in the art that it is not so limited, but is susceptible to various changes without departing from the scope of the invention.

What is claimed is:

1. A system for matching a harness of conductors with apertures in a connector, the system comprising:

a harness having a plurality of conductors;

a connector having a plurality of apertures for receiving the conductors;

a computer having a visual display for displaying information to a user;

a data base coupled to the computer, the data base having information regarding the conductors and the connector;

reading means coupled to the computer for reading information associated with individual ones of the conductors; and a light array coupled to the computer and connectable to the connector, the light array having a plurality of light conductors for illuminating individual ones of the apertures in the connector in response to commands from the computer in order to designate to the user the aperture in which each conductor should be located.

2. The system of claim 1, wherein the reading means comprises a microphone and software coupled to the computer for receiving voice information from the user regarding the conductors when read aloud by the user to identify the conductors.

3. The system of claim 1, wherein the reading means comprises a bar code reader and software coupled to the computer for scanning information from the conductors to identify the conductors.

4. The system of claim 1, wherein the reading means comprises a computer mouse and/or keyboard for manual entry of information from the conductors to identify the conductors.

5. The system of claim 1, further comprising an input/output expander circuit coupled between the computer and the light array, the input/output expander circuit having a communication cable extending to the computer, and a light cable extending to the light array.

6. The system of claim 1, wherein the light array backlights a selected one of the apertures in the connector for the user to indicate the aperture in which a selected one of the conductors should be inserted.

7. The system of claim 1, wherein the visual display of the computer graphically illustrates a selected one of the apertures in the connector to indicate the aperture in which a selected one of the conductors should be inserted.

8. The system of claim 1, wherein the user selects an input method for reading information from the conductors from a list of options on the visual display of the computer.

9. The system of claim 1, wherein the light array comprises a cover plate, an array of LEDs mounted to a circuit board on the cover plate, a separation plate mounted to the cover plate over the array of LEDs, a light rod guide plate mounted to the separation plate, a mating connector for coupling with the connector and having a plurality of apertures, a light rod extending between each of the apertures in the mating connector and each of the LEDs, and a covering for integrating components of the light array.

10. The system of claim 9, wherein the light rod guide plate accommodates various diameters of light rods.

11. A system for matching a harness of conductors with apertures in a connector, the system comprising:

a plurality of harnesses, each having a plurality of conductors;

a plurality of connectors, each having a plurality of apertures for receiving terminal ends of the conductors;

a computer having a visual display for displaying information to a user;

a data base coupled to the computer, the data base having information regarding the conductors and the connectors;

reading means coupled to the computer for reading information associated with individual ones of the conductors and the connectors; and a light array coupled to the computer and connectable at least one of the connectors, the light array having a plurality of light conductors for back-lighting an associated one of the apertures in a selected one of the connectors in response to commands from the computer in order to designate to the user the aperture in which each terminal end should be inserted.

12. The system of claim 11, wherein the reading means comprises a head set and software coupled to the computer for receiving voice information from the user regarding the conductors and the connectors when read aloud by the user to identify the conductors and the connectors.

13. The system of claim 11, wherein the reading means comprises a bar code reader and software coupled to the computer for scanning information from the conductors and the connectors to identify the conductors and the connectors.

14. The system of claim 11, wherein the visual display of the computer graphically illustrates the associated one of the apertures in the selected one of the connectors.

15. The system of claim 11, wherein the user selects an input method for reading information from the conductors and the connectors from a list of options on the visual display of the computer.

16. The system of claim 11, wherein the light array comprises a cover plate, an array of LEDs mounted to a circuit board on the cover plate, a separation plate mounted to the cover plate over the array of LEDs, a light rod guide plate mounted to the separation plate, a mating connector for coupling with the connector and having a plurality of apertures, a light rod extending between each of the apertures in the mating connector and each of the LEDs, and a covering for integrating components of the light array.

* * * * *